Nov. 12, 1929.  M. A. MIKESH  1,735,332
REVERSE BRAKE FOR AUTOMOBILES
Filed Feb. 9, 1925  2 Sheets-Sheet 2
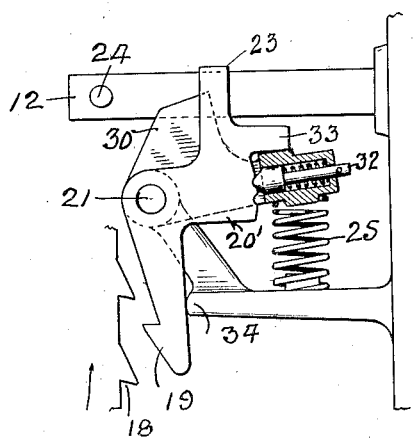
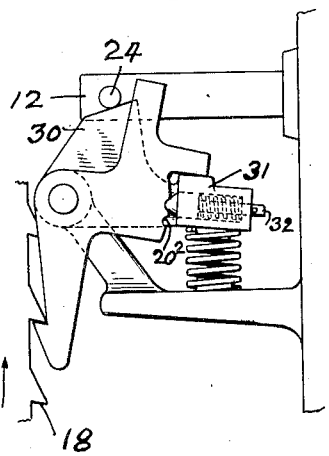
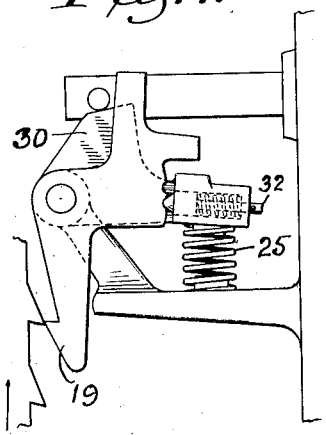
INVENTOR.
MARTIN A. MIKESH, Patented Nov. 12, 1929

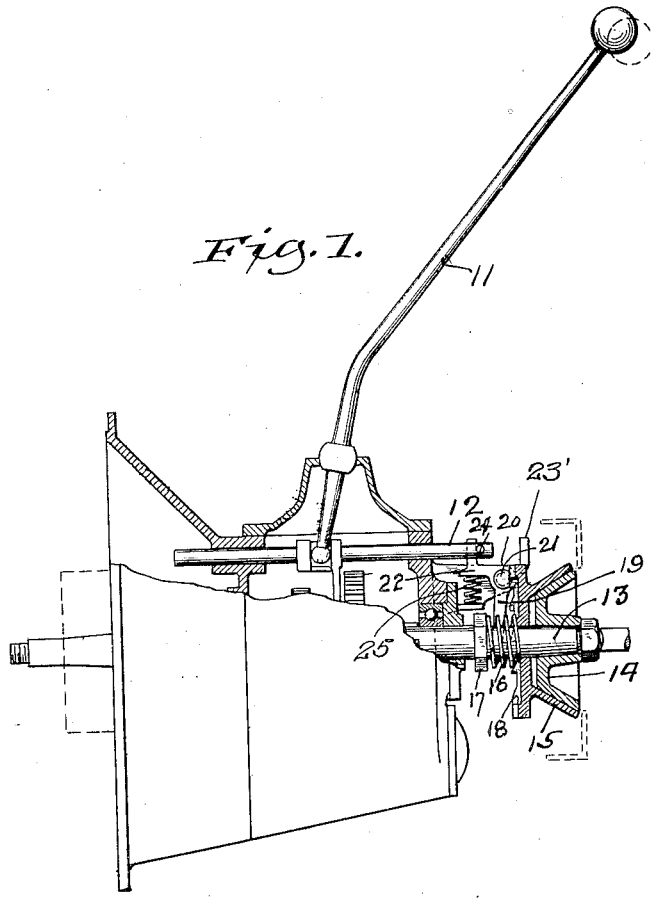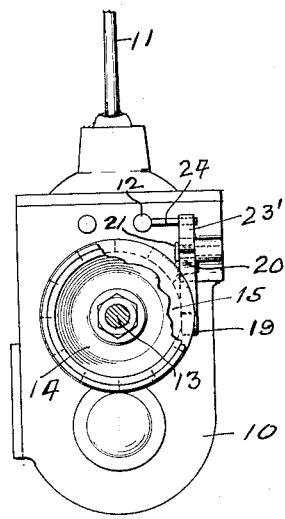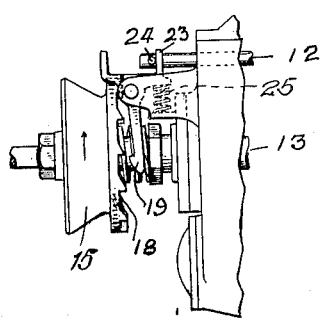

1,735,332

UNITED STATES PATENT OFFICE

MARTIN A. MIKESH, OF MILWAUKEE, WISCONSIN

REVERSE BRAKE FOR AUTOMOBILES

Application filed February 9, 1925. Serial No. 8,055.

The invention relates to an auxiliary brake operated in conjunction with the transmission, and its purpose is the provision of quick-acting means which will enable the operator to overcome the reverse movement of the car when the latter has been halted in ascending a grade in the roadway.

Under such conditions, when the ordinary brakes are released at the moment of picking up, there is a tendency upon the part of the car to move backward down the grade, and it requires very careful attention and manipulation of the clutch, brakes and accelerator to overcome such tendency and effect forward movement of the car without stalling the engine.

The invention resides in an auxiliary clutch or brake for the transmission shaft which is brought into action by an overthrow of the transmission lever, when the low-gear connection is effected preparatory to again starting the car, the connections being such that the shaft is restrained from rotation at such time but is released immediately as the main clutch is engaged upon relaxation of the overthrow of the transmission lever, the auxiliary braking devices becoming inoperative in such relaxing movement.

The details of the invention will now be particularly described, and the novelty thereof will be pointed out in the appended claim.

In the accompanying drawings:

Figure 1 is a view in side elevation, partly in longitudinal vertical section, of the conventional transmission with my improvements applied thereto.

Fig. 2 is an end elevation, looking from the right of Fig. 1.

Fig. 3 is a fragmentary view in elevation, looking from the opposite side of Fig. 1.

Fig. 4 is a diagram showing the several positions of the transmission lever, and showing the direction and extent of the overthrow movement of the said lever.

Figs. 5, 6 and 7 are details of a modification of the devices shown in Fig. 1.

Referring to the drawings, the numeral 10 indicates the transmission case in which is mounted the transmission lever 11, the slide 12, and the transmission shaft 13, the latter being connected to the drive shaft through a universal joint. Upon the latter is mounted an auxiliary cone clutch, the member 14 being fixed thereon and the engaging member 15 being loose, the latter having a frictional engagement with the member 14, by means of an expansion spring 16 about the shaft. The said spring is confined by a nut 17 upon the shaft, and the spring, adjusted to any holding power, exerts its pressure against the outer face of the clutch member 15, so as to cause their effective surfaces to be in frictional engagement at all times, so that they ordinarily will rotate as one part.

Upon the outer face of the member 15, a circular row of teeth 18 is formed, the said teeth being arranged for engagement by a hook pawl 19, formed upon an arm of a bell-crank lever 20, pivotally mounted upon a pin 21, fixed in the transmission casing 10. The other arm 22 of the bell-crank is provided with an upstanding projection 23, adapted to be engaged by a pin 24, set transversely in the transmission slide 12.

A confined expansion spring 25 bears against the underside of the arm 22, and normally holds the bell-crank in a position in which the pawl is disengaged from the teeth 18 of the clutch member 15, and stands at one side thereof. The pin 24, fixed in the rear end of the slide 12, is adapted in the overthrow movement of the lever 11, to engage the projection 23, and turn the bell-crank, following the shift into low gear. Such movement of the bell-crank will engage the pawl thereon with the teeth 18, and serve to hold the shaft 13 against rotation ordinarily. The frictional engagement between the members 14 and 15 of the auxiliary cone clutch, is provided for the purpose of avoiding too sudden a jar, in case the car has already started to move backward.

The arresting devices can be brought into operation only when a shift into low gear is made, and the overthrow involves a movement of the free end of the transmission lever to the extent of about three-fourths of an inch only. Under the conditions existing in cars at the present time, which it is the purpose of this invention to remedy, the operator of the car is required to resort to extra motions which must be carefully performed to avoid more serious effort. But with my invention, the motions upon the part of the operator do not exceed those required upon a level roadway. With my invention, it is not necessary for the operator to resort to the use of the emergency brake or the hand throttle, or to allow the clutch to slip, in picking up; the latter is destructive and the first two are not expeditious.

The upstanding lug 23' on the bell-crank opposite to the projection 23, is provided as a safety device in the reverse operation of the automobile. The pin 24 or the slide rod 12, plays between the said lug and projection, and when the reverse gear is thrown in, the said pin engages the lug 23', and acts positively to hold the pawl 19 from engagement with the teeth 18, so that if for any reason, the spring 25 should fail to function during the reverse movement of the automobile, no damage will result.

In Figs. 5, 6 and 7, I pivot a cam 30 upon the pin 21, together with the bell-crank 20', the form of which is somewhat changed, but the main operating features of which are preserved. The bell-crank is notched at one side of the pivot pin, as at $20^2$. The cam 30 carries upon its horizontally extending arm or part 31, a spring-pressed pin 32, the point of which is adapted to enter either of the notches $20^2$ in the bell-crank. The expansion spring 25 bears against the horizontal part 31, and this in turn against the underside of the arm 33 of the bell-crank, so as to normally turn the latter and withdraw the pawl, as before described. A stop 34 is arranged to arrest the movement of the bell-crank under the pressure of the spring, when the pin 24 is disengaged from the bell-crank by the movement of the transmission lever to any other than low gear position, the stop 34 will engage the bell-crank, and the spring 25 will continue to move the arm 31, to carry the spring-pressed pin from the lower to the upper notch $20^2$. The parts will remain as thus positioned until after the shift to low-gear position has been made, when the cam 30 will be struck by the pin 24, and as the pawl 19 engages the teeth 18, the cam will be turned so as to pass the spring-pressed pin 32 into the lower notch $20^2$ of the arm. This construction provides a connection between the parts which will yield so as to avoid sudden shocks and strains.

Having thus described my invention, what I claim and desire to secure by Letters Patent of the United States, is:

The combination with an automobile transmission having a clutch shaft and a shifting lever movable from a neutral position in which said transmission is inoperative to a plurality of other positions wherein said transmission is rendered operative, of a ratchet disk mounted on said shaft so as to resist rotation relatively thereto, a pawl operable positively to engage the ratchet to restrain reverse rotation thereof, resilient means normally operable to prevent engagement of said pawl with said ratchet, and means operably associated with said pawl and said shifting lever for moving said pawl into engagement with said ratchet by moving said lever from its neutral position to a position wherein said transmission is rendered operative.

In testimony whereof, I have signed my name at Milwaukee, this 15th day of January, 1925.

M. A. MIKESH.